United States Patent [19]
Akamatsu et al.

[11] Patent Number: 5,519,494
[45] Date of Patent: May 21, 1996

[54] PIPE INNER SURFACE MEASURING METHOD AND APPARATUS

[75] Inventors: Masaru Akamatsu; Norio Suzuki; Noritsugu Fujii; Satoshi Yanai, all of Kobe, Japan

[73] Assignee: Kabushiki Kaisha Kobe Seiko Sho, Kobe, Japan

[21] Appl. No.: 255,987

[22] Filed: Jun. 8, 1994

[30] Foreign Application Priority Data

Jun. 8, 1993 [JP] Japan .................................. 5-137327
Jun. 8, 1993 [JP] Japan .................................. 5-137329

[51] Int. Cl.⁶ .................................. G01B 11/30
[52] U.S. Cl. .................................. 356/371
[58] Field of Search .................................. 356/241, 371, 356/237, 369, 445–448, 73

[56] References Cited

U.S. PATENT DOCUMENTS

| | | | |
|---|---|---|---|
| 2,313,218 | 3/1943 | Brace et al. | 356/241 |
| 3,749,496 | 7/1973 | Hietanen et al. | 356/73 |
| 4,440,496 | 4/1984 | Milana et al. | 356/241 |
| 4,707,132 | 11/1987 | Dutton | 356/241 |
| 5,053,822 | 10/1991 | Butler | 356/446 X |

Primary Examiner—Richard A. Rosenberger
Assistant Examiner—K. P. Hantis
Attorney, Agent, or Firm—Oblon, Spivak, McClelland, Maier & Neustadt

[57] ABSTRACT

Light is introduced to an inner surface of a fine tube, which is an object for measurement of the inner surface roughness, through a first end of the fine tube at a small angle with respect to a center line of the fine tube and the light emerging from a second end of the fine tube after the light is reflected by multiple reflections within the fine tube is measured to evaluate the roughness of the inner surface of the fine tube. Upon such measurement, the light to be introduced to the first end of the fine tube is converged once on the center line of the fine tube and then diverged again, and the polarization direction of the light to be introduced to the first end of the fine tube is set to an angle equal to or around 90 degrees with respect to the reflection surface of the fine tube. Thus, the roughness of the inner surface of the fine tube can be calculated in accordance with a result of detection of the intensity of emergent light from the fine tube by means of a photo detector.

8 Claims, 7 Drawing Sheets

PIPE INNER SURFACE MEASURING METHOD AND APPARATUS

BACKGROUND OF THE INVENTION

1. Field of the Invention

This invention relates to a method of and an apparatus for measuring the roughness of the inner surface of a fine tube, and more particularly to a method of and an apparatus for non-destructively measuring the roughness of the inner surface of a gas supplying fine tube, for example, for a semiconductor manufacturing equipment.

2. Description of the Related Art

In a semiconductor manufacturing equipment, fine circuit patterns are formed in a plurality of layers on a silicon wafer serving as a substrate making use of the technique of photoengraving to form a circuit on the silicon wafer. The width of the circuit patterns is as fine as approximately 1 μm, and in order to form such fine circuit patterns, it is important to keep the inside of the semiconductor manufacturing equipment clean. Thus, in order to prevent admission of fine dust into the semiconductor manufacturing equipment, the inner surface of a fine tube for supplying raw material gas for formation of circuit patterns therethrough is worked by mirror surface working to prevent such a trouble that dust sticks to bottom portions of the unevenness of the inner surface of the fine tube and is admitted into the semiconductor manufacturing equipment together with raw material gas.

In order to secure the quality of the inner surface roughness of fine tubes for a semiconductor manufacturing equipment, a fine tube inner surface roughness evaluation technique is employed wherein a fine tube sampled out for measurement of the inner surface roughness is divided longitudinally in an axial direction and the inner surface of a test piece obtained by such longitudinal division is measured by means of a surface roughness tester of the contact type.

In the contact type fine tube inner surface roughness evaluation technique, since the inner surface of the test piece as an object for measurement is a curved surface having a small radius of curvature, stable measurement of the inner surface roughness is impossible. Further, the test piece thus measured is manufactured for a sample test from among fine tubes to be used actually, and there is a problem in that the quality of fine tubes to be used actually cannot be secured. Therefore, a measurement method by which the inner surface roughness of a fine tube to be used actually can be non-destructively tested is demanded.

SUMMARY OF THE INVENTION

It is an object of the present invention to provide, in order to solve such subjects of the prior art as described above, a method of and an apparatus for measuring the roughness of the inner surface of a fine tube by which the roughness of the inner face of an elongated fine tube can be non-destructively tested.

In order to attain the object described above, according to a first aspect of the present invention, a method of and an apparatus for measuring the roughness of an inner surface of a fine tube wherein light is introduced to the inner surface of a fine tube, which is an object for measurement of the inner surface roughness, through a first end of the fine tube at a small angle with respect to a center line of the fine tube and the light emerging from a second end of the fine tube after the light is reflected by multiple reflections within the fine tube is measured to evaluate the roughness of the inner surface of the fine tube, are constructed such that the light to be introduced to the first end of the fine tube is converged once on the center line of the fine tube and then diverged, and the polarization direction of the light to be introduced to the first end of the fine tube is set to an angle equal to or around 90 degrees with respect to the reflection surface of the fine tube.

The incident optics system may include an optical axis adjustment mechanism for adjusting the optical axis of the light from the light source so that the converging point of the light coincides with the center line of the fine tube.

The apparatus for measuring the roughness of the inner surface of a fine tube may further comprise a movable table for movably holding the entire incident optics system thereon, the optical axis of the light from the light source being adjusted by adjusting the position of the movable table.

The holding mechanism may include a mechanism for rotating the fine tube around the axis of the same.

According to a second aspect of the present invention, a method of measuring the roughness of an inner surface of a fine tube wherein light is introduced to the inner surface of a fine tube, which is an object for measurement of the inner surface roughness, through a first end of the fine tube at a small angle with respect to a center line of the fine tube and the light emerging from a second end of the fine tube after the light is reflected by multiple reflections within the fine tube is measured to evaluate the roughness of the inner surface of the fine tube comprises the steps of measuring the intensity of light of specular reflection components and the intensity of light of diffuse scattering (reflection) components of the light emerging from a second end of the fine tube, and measuring the roughness of the inner surface of the fine tube in accordance with the ratio between the intensity of light of the specular reflection components and the intensity of light of the diffuse scattering (reflection) components.

The light emerging from the fine tube may be converged, and the intensity of light at a central portion of the converged light and the intensity of light at a peripheral portion of the converted light may be measured separately from each other to measure the intensity of light of the specular reflection components and the intensity of light of the diffuse scattering (reflection) components.

Further, an apparatus for measuring the roughness of the inner surface of a fine tube comprises a holding mechanism for holding a fine tube which is an object for measurement of the inner surface roughness, an incident optics system for introducing the light from the light source into the fine tube at a small incident angle with respect to a center line of the fine tube, a receiving optics system for converging light emerging from a second end of the fine tube at a predetermined convergence position, a photo detector disposed at the convergence position of the emergent light for measuring the intensity of light at a central portion of the convergent light and the intensity of light at a peripheral portion of the convergent light separately from each other, and signal processing means for calculating the roughness of the inner surface of the fine tube in accordance with the ratio between the intensity of light at the central portion of the convergent light and the intensity of light at the peripheral portion of the convergent light measured by the photo detector.

According to the first aspect of the present invention, since incident light is converged once on the center line of the fine tube and then diverged, the light reflected on the inner surface of the fine tube passes a normal plane of the inner surface of the fine tube, and consequently, the reflected light passes the center line of the fine tube and propagates in the fine tube while repeating multiple reflections.

Further, since the polarization plane of the incident light is set to an angle equal to or around 90 degrees with respect to the reflection surface, the reflection factor becomes equal to a maximum value which depends upon the material of the fine tube.

And, the intensity of light emerging from the second end of the fine tube increases in proportion to the product of the reflection factors at the multiple reflection points on the inner surface of the fine tube. Meanwhile, there is another nature that, as the roughness of the inner surface of the fine tube increases, the reflection factor on the inner surface of the fine tube decreases, and the intensity of the emergent light measured by the light intensity measuring photo detector corresponds to surface roughness of the reflection points on the inner surface of the fine tube.

As a result, the roughness of the inner surface of the fine tube is measured in accordance with the intensity of the emergent light.

Further, where the convergence point of the light is made coincide with the center line of the fine tube by the optical axis adjustment mechanism, the intensity of the emergent light is not decreased, and a sufficient intensity of the emergent light is assured.

Further, the entire incident optics system can be moved by means of the movable table to adjust the optical axis of the light from the light source so that the convergence point of the light may coincide with the center of the photo detector.

Furthermore, if the fine tube is rotated around the axis thereof by the holding mechanism, the incident light undergoes repetition of multiple reflections over the entire inner surface of the fine tube, and the surface roughness of the entire inner surface can be measured.

According to the second aspect of the present invention, as the roughness of the inner surface of a fine tube increases, specular reflection components of the emergent light decrease while diffuse scattering (reflection) components increase. Consequently, making use of the decrease of the specular reflection components and the increase of the diffuse scattering (reflection) components, the roughness of the inner surface of the fine tube can be measured with a high degree of accuracy in accordance with the ratio between the two components.

When the optical axis of the incident light to the first end of the fine tube is offset from the axial center line of the fine tube, the entire value of the intensity of the emergent light from the second end of the fine tube exhibits a great variation, but the ratio between the specular reflection components and the diffuse scattering (reflection) components exhibits little variation. On the other hand, when the intensity of light emitted from the light source and introduced into the fine tube varies, a similar effect appears in both of the intensity of light of the specular reflection components and the intensity of light of the diffuse scattering (reflection) components. Accordingly, if the ratio between the two components is calculated, then the influence of them is compensated for, and the ratio between the intensities of light is free from an influence of the variation of the intensity of emitted light from the light source. Accordingly, if the roughness of the inner surface is measured in accordance with the ratio between the two intensities of light, an influence of the variation of the incident light is eliminated.

Further, where the light to emerge from the second end of the fine tube is emitted in such a condition that the specular reflection components of the light emerging from the second end of the-fine tube are concentrated upon a central portion and the diffuse scattering (reflection) components are dispersed at a peripheral portion, the roughness of the inner surface of the fine tube can be measured in accordance with the ratio between the intensity of light at the central portion and the intensity of light at the peripheral portion.

Meanwhile, where the emergent light from the fine tube is converged on the light receiving element, the intensity of light at the central portion of the convergence light and the intensity of light at the peripheral portion of the convergence light are measured separately from each other by the light receiving element.

Furthermore, the roughness of the inner surface of the fine tube can be calculated by the signal processing means in accordance with the ratio between the intensity of light at the central portion of the convergence light and the intensity of light at the peripheral portion of the convergence light measured by the light receiving element.

As a result, the roughness of the inner surface of the fine tube can be non-destructively tested with a high degree of accuracy without being influenced by the variation of the intensity of incident light to the fine tube or the offset of the optical axis of the incident light.

DETAILED DESCRIPTION OF THE PREFERRED EMBODIMENTS

Figures 1A, 1B:
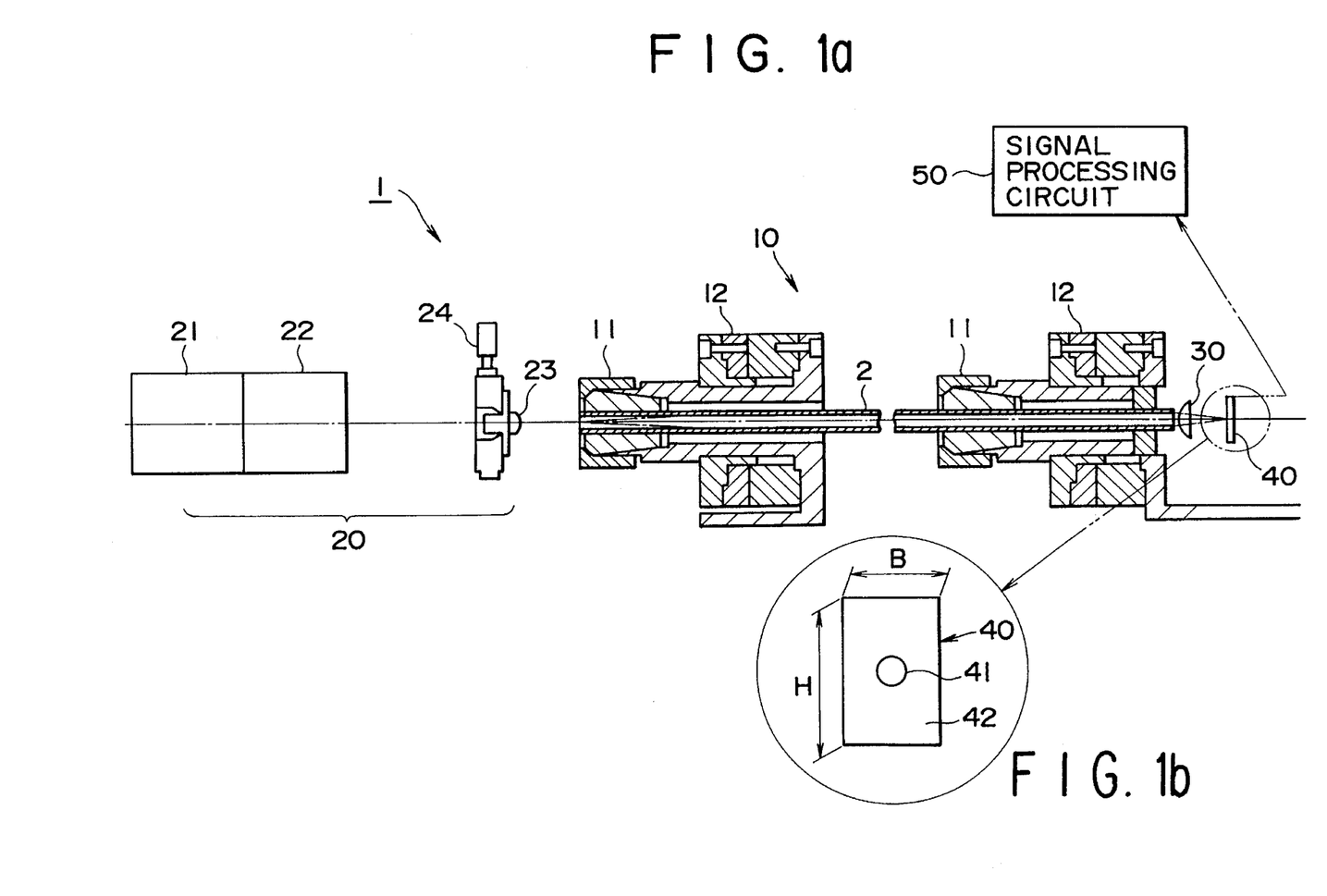
FIGS. 1a–1b is a side view showing a general construction of a fine tube inner surface roughness measurement apparatus according to an embodiment of the present invention.
Figure 2:
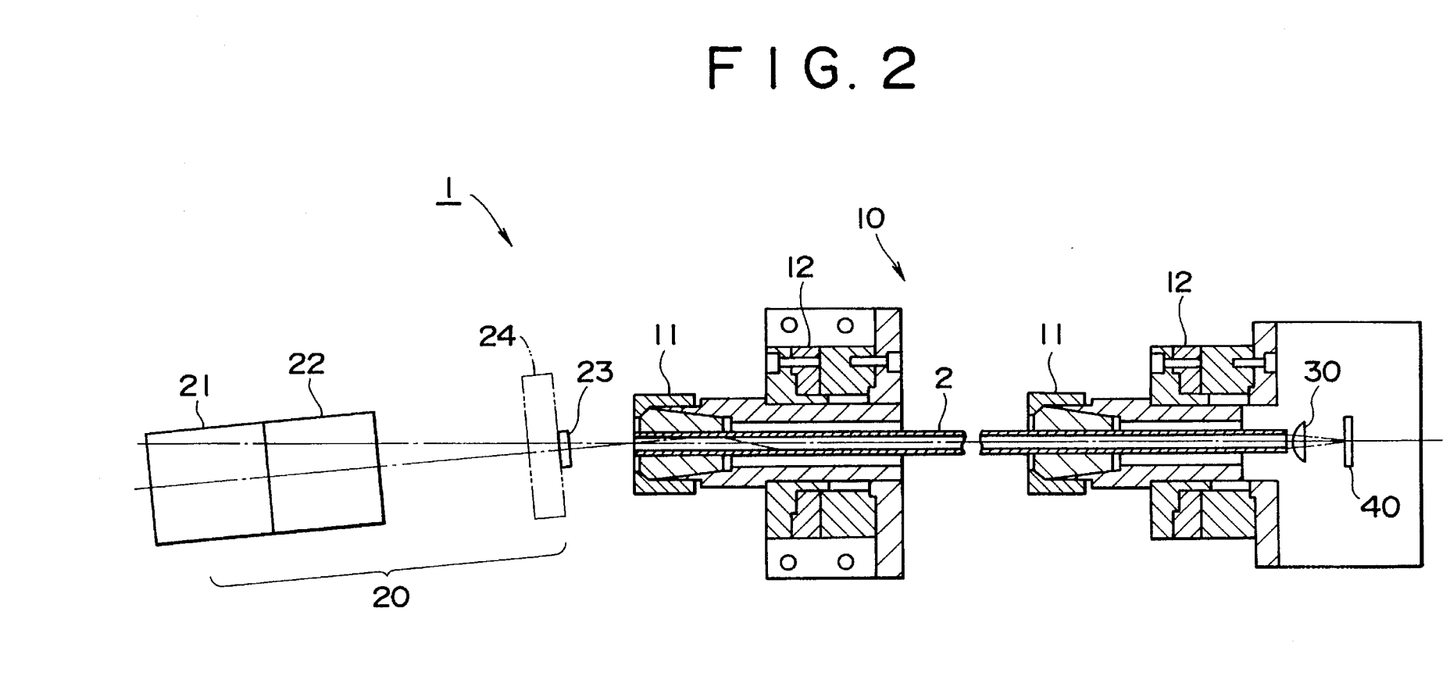
FIG. 2 is a plan view showing a general construction of the fine tube inner surface roughness measurement apparatus of FIGS. 1a–1b.
Figure 3:
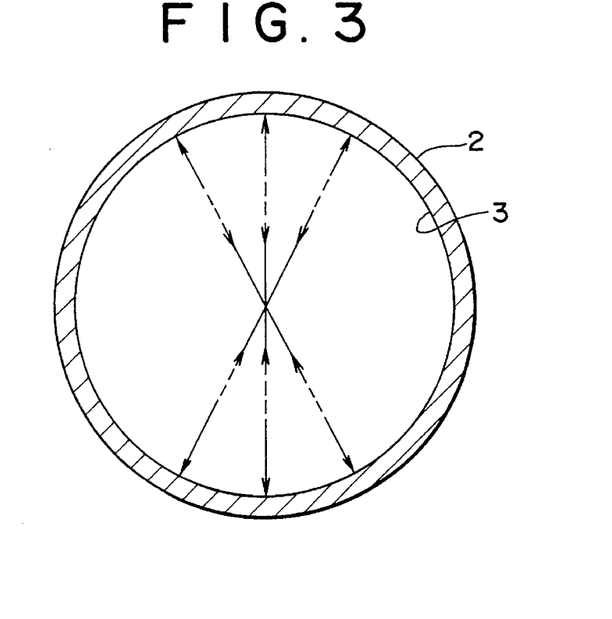
FIG. 3 is a schematic diagram illustrating a manner in which incident light is reflected within a fine tube.
Figure 4:
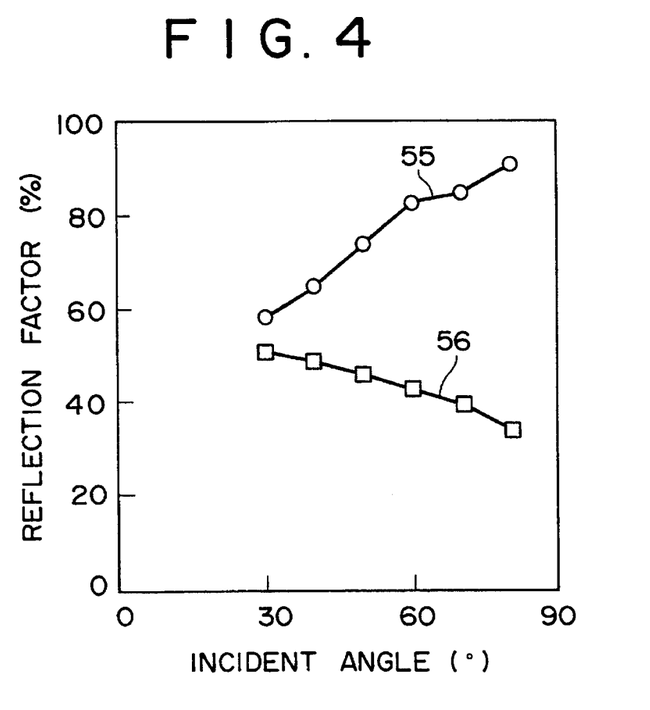
FIG. 4 is a graph showing the variation of the reflection factor with respect to the angle of incidence of light.
Figure 5:
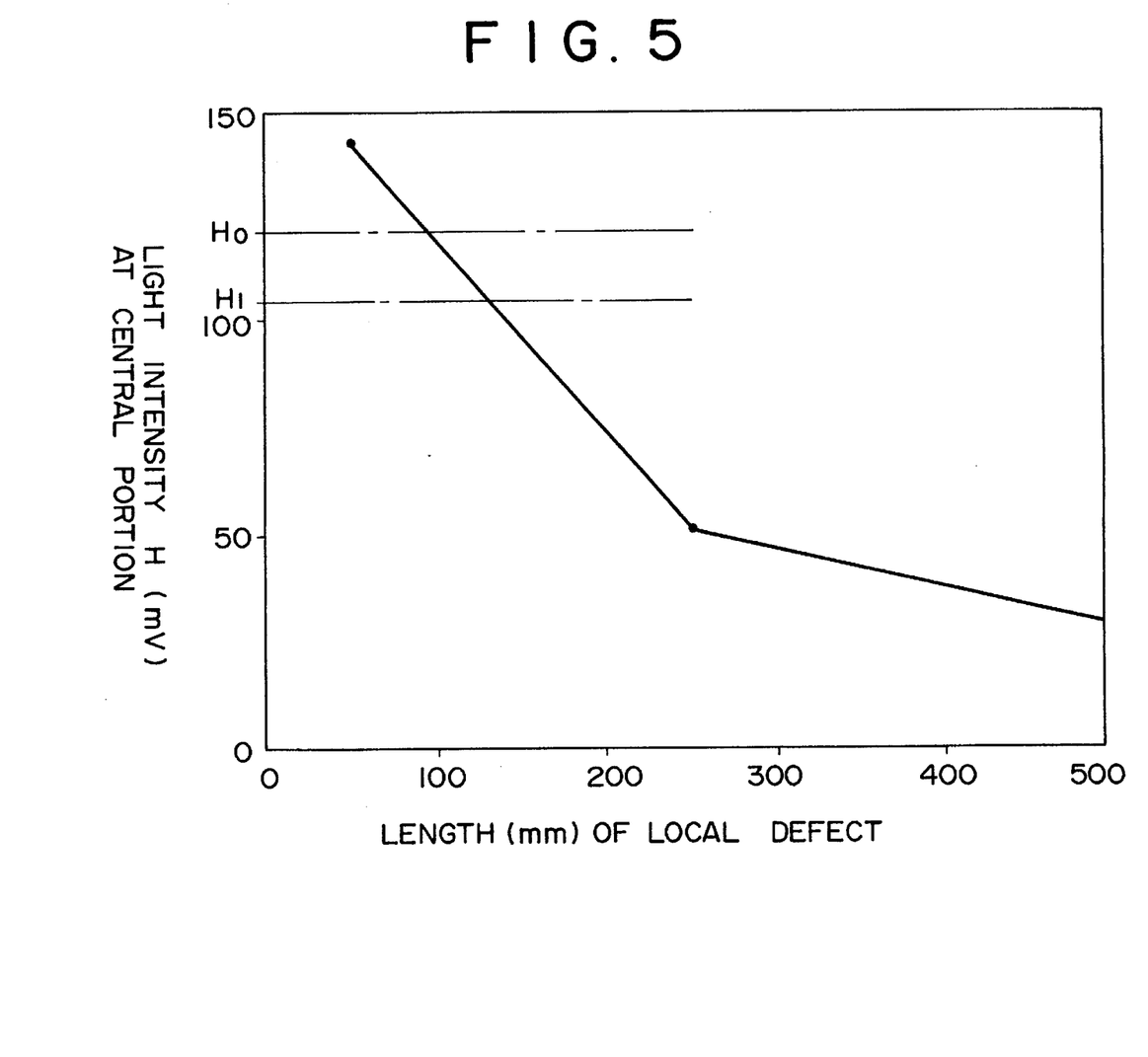
FIG. 5 is a graph showing the variation of the intensity of emergent light with respect to the length of a defect of the inner surface of a fine tube.
Figure 6:
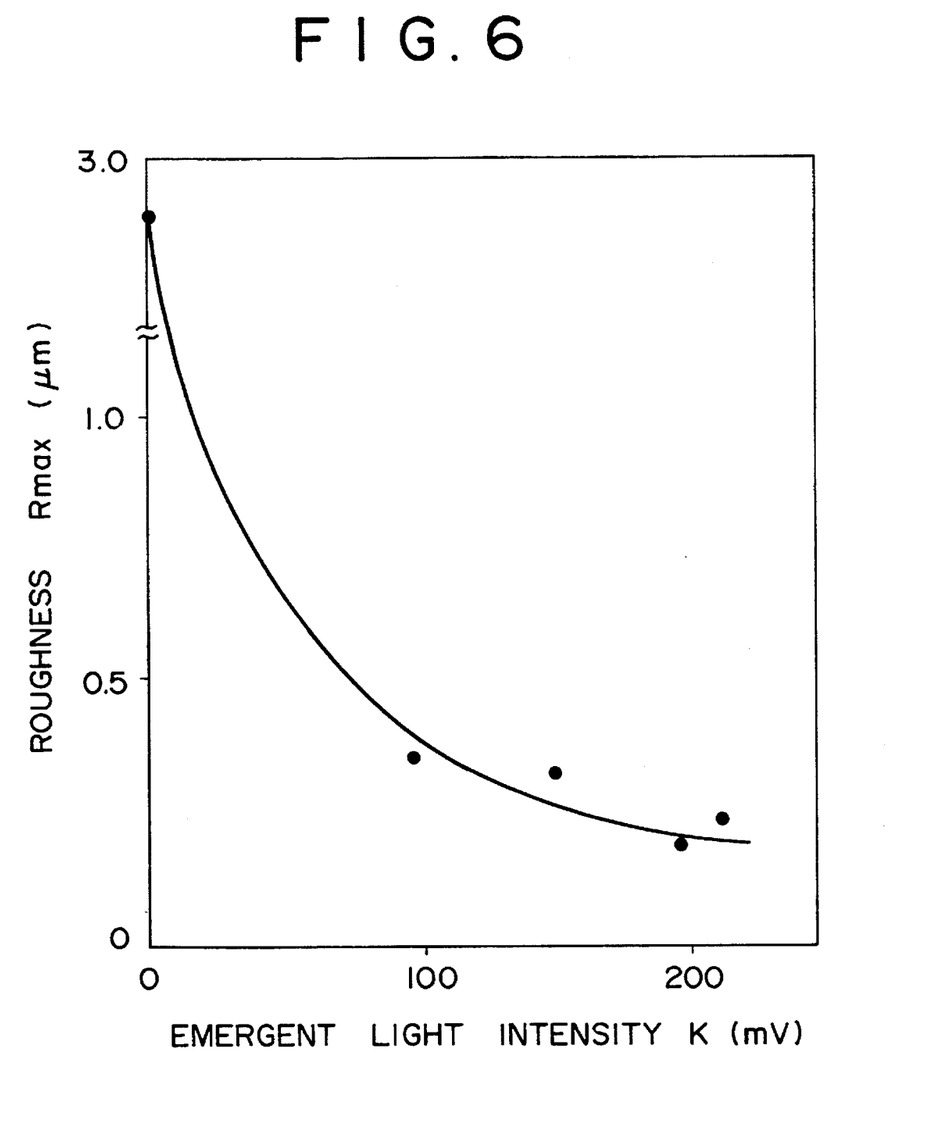
FIG. 6 is a graph illustrating the relationship between the intensity of emergent light and the roughness of the inner surface of a fine tube.

In the following, an embodiment in which the present invention is embodied will be described with reference to the drawings to facilitate understanding of the present invention. It is to be noted that the embodiment described below is a mere example of an embodiment of the present invention and is not of the nature of limiting the technical scope of the present invention. Here, FIGS. 1a–1b is a side view showing a general construction of a fine tube inner surface roughness measurement apparatus 1 according to the embodiment of the present invention, FIG. 2 is a plan view of the measurement apparatus 1, FIG. 3 is a schematic diagram illustrating a manner in which incident light is reflected within a fine tube, FIG. 4 is a graph showing the variation of the reflection factor with respect to the angle of incidence of light, FIG. 5 is a graph showing the variation of the intensity of emergent light with respect to the length of a defect of the inner surface of a fine tube, and FIG. 6 is a graph illustrating the relationship between the intensity of emergent light and the roughness of the inner surface of a fine tube. As shown in FIGS. 1a–1b, the fine tube inner surface roughness measurement apparatus 1 according to the present embodiment includes a holding mechanism 10 for holding a fine tube 2 of the size of 4 mm in inner diameter×6 mm in outer diameter×4 m in length made of stainless steel and serving as an object for measurement of the inner surface roughness, an incident optics system 20 for determining incidence conditions of light from a laser light source 21 to be irradiated to a first end of the fine tube 2, a condensing lens 30 (corresponding to a receiving optics system) for condensing light emerging from a second or the other end of the fine tube 2, a photo detector 40 for measuring the intensity of received light condensed by the condensing lens 30, and a signal processing circuit 50 (corresponding to signal processing means) for processing an electric signal from the photo detector 40.

The holding mechanism 10 includes a pair of collet chucks 11 for holding the opposite end portions of the fine tube 2. The collet chucks 11 hold the opposite end portions of the fine tube 2 at a predetermined position at which the axial center of the fine tube 2 coincides with the optical axes of the incident optics system 20 and the receiving optics system 30 with reference to the outer diameter of the fine tube 2. Each of the collet chucks 11 has a rotary table 12. The fine tube 2 grasped by the collet chucks 11 is driven to rotate by the rotary tables 12 to measure the roughness of the entire inner surface of the fine tube 2.

The incident optics system 20 for irradiating light into the opening at the first end of the fine tube 2 includes a beam expander 22 to increase the diameter of a beam of laser light emitted from the laser light source 21, which has a built-in helium neon laser of the output power of 5 mW and the beam diameter of 0.7 mm. The beam expander 22 maintains the beam diameter at approximately 3 mm, which is smaller than the inner diameter of the fine tube 2, even after the laser light propagates to the second end of the fine tube 2. The laser light source 21 has built-in polarization means not shown for polarizing the laser light. The polarization direction of the laser light is set an angle equal to or around 90° with respect to the inner surface of the fine tube 2. The laser light source 21 and the beam expander 22 irradiate the laser light at the incident angle of 85° inclined by 5° with respect to the axial center of the fine tube 2 as viewed in plan as shown in an enlarged scale in FIG. 2. A cylindrical lens 23 having a focal length of, for example, 25 mm is disposed between the beam expander 22 and the first end of the fine tube 2. The cylindrical lens 23 is held on an optical axis adjustment jig 24 for adjusting the vertical position of the cylindrical lens 23, and converges a beam of light output from the beam expander 22 once into a line shape at the focus point of the lens and then diverges the beam. The cylindrical lens 23 has a focus for laser light to be introduced into the first end of the fine tube 2, which coincides with the axial center line of the fine tube 2. The laser light introduced into the fine tube 2 by the incident optics system 20 undergoes repetitive multiple reflections on the inner surface of the fine tube 2 until it propagates in the fine tube 2 to and is then emitted from the second end of the fine tube 2.

The condensing lens 30 for condensing light output from the fine tube 2 and the photo detector 40 are successively disposed in the proximity of the second end of the fine tube 2 from which laser light is outputted. The focal length of the condensing lens 30 is set so that laser light output from the fine tube 2 is condensed upon the photo detector 40. The photo detector 40 converts the optical intensity of the received laser light into an electric current and outputs the photo-electric current to the signal processing circuit 50.

The signal processing circuit 50 calculates the intensity of output light output from the second end of the fine tube 2 to calculate the reflection factor r of light on the inner surface of the fine tube 2. The reflection factor r is calculated, if the inner surface of the fine tube 2 is uniform over the overall length thereof and the reflection factor r of light is fixed and besides no divergence of light is involved, in accordance with the following equation (1):

$$P0 = Pi \times r^n \qquad (1)$$

where P0 is the intensity of emergent light, Pi is the intensity of incident light, and n is the number of times of multiple reflections.

Here, the multiple reflection time number n is given by the following equation (2):

$$n = L/(d/\tan(\theta)) \qquad (2)$$

where L is the overall length of the fine tube 2, d is the inner diameter of the fine tube 2, and θ is the incident angle of the laser light with respect to the axial center line of the fine tube 2.

From the equations (1) and (2) given above, the reflection factor r is calculated. In particular, the intensity of emergent light from the fine tube 2 increases in proportion to the product of the reflection factors at the multiple reflection points of the light. Simultaneously, since there is a nature that, as the inner surface roughness of the fine tube 2 increases, the reflection factor decreases, if the optical intensity of the emergent light, that is, the emergent light intensity P0, is measured, then the reflection factor r is obtained as a value on which the roughness at the reflection points of the inner surface of the fine tube 2 is reflected as described above.

Subsequently, an inner surface roughness measurement method by the apparatus of the embodiment described above will be described. First, the beam diameter of laser light polarized in the predetermined direction by the laser light source 21 is expanded by the beam expander 22, and then, the laser light is introduced into the first end of the fine tube 2 at the incident angle of 85° so that it is first converged upon the axial center line of the fine tube 2 and then diverged. In this instance, the fine tube 2 is held in a rotating condition by the holding mechanism 10, and the laser light is introduced so that it may irradiate upon the entire inner surface of the fine tube 2. After the laser light introduced into the fine tube 2 is once converged upon the axial center line of the fine tube 2 and then diverged, it is reflected by the inner surface 3 of the fine tube 2 as shown in FIG. 3 so that it returns to the center line of the fine tube 2 in the axial direction again to repeat multiple reflections. The laser light introduced into the fine tube 2 is thus reflected by multiple reflection by the inner surface of the fine tube 2 until it propagates to the second end of the fine tube 2. The decrease of the intensity of laser light by multiple reflections while the laser light propagates in the fine tube 2 is given by the equation (1) above. Meanwhile, the limit to the intensity of light which can be detected by the photo detector 40 commonly is approximately 1 μW, and the output of the laser light source 21 is 5 mW. Accordingly, the allowable attenuation amount while the laser light propagates in the fine tube 2 is 1 μW/5 mW=$2 \times 10^{-4}$.

Here, the reflection factor of light on the inner surface 3 of the fine tube 2 when the polarization direction and the incident angle of incident light to the fine tube 2 made of stainless steel were varied was measured, and a result of the measurement is shown in FIG. 4. From a characteristic 55 when the polarization plane is perpendicular to the reflection surface and another characteristic 56 when the polarization plane is parallel to the reflection surface in FIG. 4, it can be seen that, when the incident angle is set to a such a great angle as 85° or so, the reflection factor of light is approximately 95%. The reason why the reflection factor of light on the inner surface 3 is varied by the polarization direction and the incident angle of incident light in this manner is considered that, when light comes upon the surface of a metal material, eddy current flows in the metal material due to an alternating magnetic field of the light and part of the energy of the light is consumed as eddy current loss. In this instance, if it is tried to represent the reflection factor of light using a complex reflection factor, then it is represented like the equations (66) and (67) of Kozo Ishiguro, "Optics", Kyoritsu Tosho Shuppan, First Edition, 1953, pp. 160 to 153. It is already known that the reflection factor of light is varied by the polarization direction in this manner.

Meanwhile, where the reflection factor of light on the inner surface 3 of the fine tube 2 having an inner diameter of 4 mm was 95% and the output of incident laser light was 5 mW, it can be seen from Table 1 given below that the incident angle which can be selected so that the laser light may propagate over the overall length of the fine tube 2 and be output in a condition in which it can be detected by the photo detector 40 is lower than 80°. Further, from the equation (2) given hereinabove, the inner diameter and the overall length of the fine tube 2 to be tested can be determined, and since the number of times of reflections within the fine tube 2 is determined from the inner diameter and the overall length of the fine tube 2, it is preferable to set the incident angle of the laser light to approximately 85°. Here, Table 1 indicates the variation of the value of the ratio between the emergent light intensity and the incident light intensity with respect to the incident angle.

surface of reflection provides a higher reflection factor, perpendicular polarization permits more accurate measurement of the surface roughness in the tube.

As described above, the reflection factor of light on the inner surface 3 of the fine tube 2 can be calculated accurately by measuring the intensity of emergent light from the fine tube 2 by means of the photo detector 40, and the roughness of the inner surface 3 of the fine tube 2 can be evaluated from the reflection factor of light. In this instance, if the inner diameter of the fine tube 2 is increased, it is possible to evaluate the roughness of the inner surface 3 even if the incident angle of the laser light to the fine tube 2 is further decreased.

A result of measurement of the intensity of emergent light from the fine tube 2, particularly, the intensity of emergent light using the intensity H of light at a central portion of emergent light where a non-polished portion having a high surface roughness was intentionally provided on the inner surface 3 of the fine tube 2 is shown by a graph of FIG. 5. From FIG. 5, if the length of the non-polished portion which makes a defect is 100 mm, the presence of the non-polished portion on the inner surface 3 of the fine tube 2 can be detected from comparison between an average value H0 and a minimum value H1 of the intensity of light at the central portion of the emergent light where the inner surface 3 of the fine tube 2 is polished over the overall length thereof.

The relationship between the intensity of the emergent light and the roughness of the inner surface 3 when the intensity of emergent light was measured for a plurality of fine tubes 2 whose inner surfaces 3 are different in roughness from one another is illustrated in FIG. 6. From FIG. 6, it can be seen that the intensity K of emergent light increases as the roughness Rmax of the inner surface 3 decreases.

Figure 7:
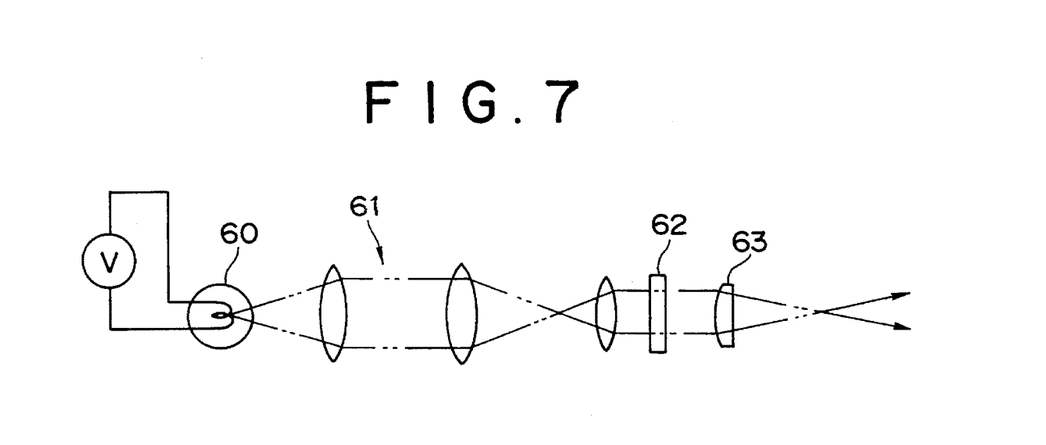
FIG. 7 is a schematic diagram showing another form of incident optics system.

It is to be noted that the present invention is not limited to the embodiment described above and can be varied to various forms. For example, where a lamp 60 which does not polarize light is used as a light source as shown in FIG. 7, light from the lamp 60 is introduced into a condenser lens system 61 and then into a polarizer 62 so that the emergent light of the condenser lens system 61 may be polarized to light of a predetermined polarization angle, and the thus polarized light may be introduced into the fine tube 2 by way of a cylindrical lens 63.

Figure 8:
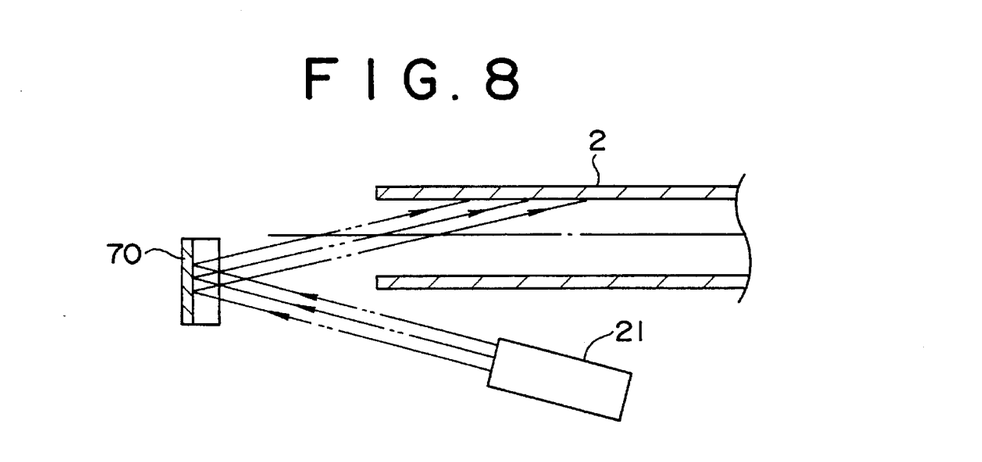
FIG. 8 is a schematic diagram showing a further form of incident optics system which employs a concave mirror having a cylindrical surface.

Further, it is otherwise possible to dispose, as shown in FIG. 8, a concave surface mirror 70 having a cylindrical surface in an opposing relationship to the first end of the fine tube 2 while the laser light source 21 is disposed below the first end portion of the fine tube 2 such that light from the laser light source 21 may be introduced into the first end of the fine tube 2 by means of the concave surface mirror 70.

Further, in order to correct an offset between the axial center line of the fine tube 2 and the optical axis of the optics

TABLE 1

| Incident Angle | Number of Times of Reflections | Emergent Light Intensity/Incident Light Intensity at Various Reflection Factors | | | |
|---|---|---|---|---|---|
| | | 0.95 | 0.90 | 0.85 | 0.80 |
| 85 | 87 | $1.15 \times 10^{-2}$ | $1.04 \times 10^{-4}$ | $7.24 \times 10^{-7}$ | $4.0 \times 10^{-9}$ |
| 80 | 176 | $1.20 \times 10^{-4}$ | $9.0 \times 10^{-9}$ | | |
| 75 | 268 | $1.07 \times 10^{-6}$ | | | |

It can be seen from Table 1 that a higher reflection factor permits a greater number of reflections, and so a greater accuracy in measuring the surface roughness of the inner surface of the tube. Since light polarized perpendicular to the system, it is possible to place the entire optics system on a movable table and provide a mechanism for adjusting the position of the entire optics system to a position at which the intensity of emergent light received by the photo detector 40 exhibits a maximum level.

In the measurement system of the present invention, if an offset amount is present between the axial center of the fine tube 2 and the axis of the incident light, then the reflected light is not reflected by multiple reflections within the same plane but propagates spirally, and the intensity of emergent light emerging from the fine tube 2 is decreased by the polarization direction dependency of the reflection factor of light.

In the present modification, however, if the optical axis of the optics system is adjusted in the vertical direction so that the incident light is introduced into the fine tube 2 in a condition in which the intensity of emergent light from the fine tube 2 exhibits its maximum level. Consequently, light emerging from the optics system advances in the inclined direction of the incident light, and a decrease of the intensity of light by the offset described above can be corrected. Accordingly, by introducing the incident light in this manner and evaluating the roughness of the inner surface 3 of the fine tube 2, the measurement error can be reduced.

In the method described above, the polarization plane of light to be irradiated upon the inner surface of the fine tube is adjusted so that the reflection factor of the light from the inner surface of the fine tube may exhibit a high value, and when the light is to be introduced to the inner surface of the fine tube through the first end of the fine tube, it is introduced such that the focal point of the incident light coincides with the axis of the fine tube and the optical axis of the incident light is inclined with respect to the axial center of the fine tube so that the incident light is reflected by multiple reflections on the inner surface of the fine tube while the intensity of light emerging from the second end of the fine tube is measured to evaluate the roughness of the inner surface of the fine tube.

With the method described above, however, there is a problem in that, when light is introduced into the fine tube through the first end of the fine tube, the intensity of the incident light is varied depending upon incidence conditions of the light and the variation of the intensity of the incident light has an influence on the result of measurement. Further, where laser light is used as a light source for incident light, there is another problem in that the intensity of laser light emitted is varied and the variation of the emitted laser light intensity has an influence upon the result of measurement.

Another embodiment which will be described below is provided in order to provide a method of and an apparatus for measuring the roughness of the inner surface of a fine tube by which the roughness of the inner surface of a fine tube can be measured without being influenced by the variation of the intensity of light when incident light is introduced into the inner surface of the fine tube in order to solve such problems or subjects as described just above.

As shown in FIGS. 1a–1b, laser light emerging from the second end of the fine tube 2 is emitted in a condition wherein specular reflection components thereof are concentrated at a central portion while diffuse scattering (reflection) components thereof are scattered at peripheral portions. There is a characteristic that, if the roughness of the inner surface of the fine tube 2 increases, then the intensity of light of the specular reflection components of emergent light decreases and the intensity of light of the diffuse scattering (reflection) components increases. Then, when the optical axis of the incident light to the first end of the fine tube 2 is offset from the axial center line of the fine tube 2, the general value of the intensity of emergent light from the second end of the fine tube 2 exhibits a great variation, but the ratio between the intensity of light of the specular reflection components and the intensity of light of the diffuse scattering (reflection) components exhibits little variation. Further, where the intensity of emitted light from the laser light source 21 varies, since an influence of a similar amount appears on both of the intensity of light of the specular reflection components and the intensity of light of the diffuse scattering (reflection) components, if the ratio between the two intensities of light is calculated, then the influence of them is compensated for, and the ratio between the two intensities of light is free from an influence of the variation of the intensity of emitted light from the laser light source 21.

The condensing lens 30 for condensing emergent light from the fine tube 2 and the photo detector 40 are disposed successively in the proximity of the second end of the fine tube 2 from which the laser light emerges. The focal length of the condensing lens 30 is set so that specular reflection components of the laser light emerging from the fine tube 2 may be converged upon the photo detector 40. The photo detector 40 has, as seen from a partial enlarged view of the photo detector 40 of FIGS. 1a–1b, a circular central light receiving portion 41 of the diameter of 0.5 mm formed at a central portion thereof for receiving specular reflection components of the laser light and a peripheral light receiving portion 42 formed in a rectangular light receiving area of the width B of 1.5 mm and the height H of 2.5 mm for receiving diffuse scattering (reflection) components of the laser light incident to a portion around the central light receiving portion 41. The photo detector 40 outputs a photo-current from the central light receiving portion 41 and another photo-current from the peripheral light receiving portion 42 independently of each other to the signal processing circuit 50.

Figure 9:
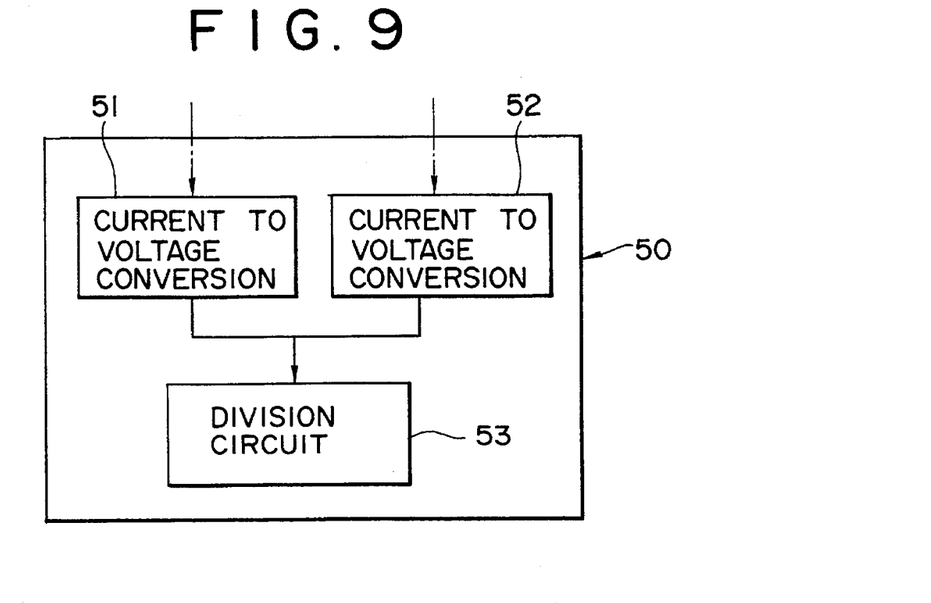
FIG. 9 is a block diagram showing a circuit construction of a signal processing circuit provided in the fine tube inner surface roughness measurement apparatus.

The signal processing circuit 50 includes, as shown in FIG. 9, a pair of current to voltage conversion circuits 51 and 52 for converting photo-currents from the central light receiving portion 41 and the peripheral light receiving portion 52 into voltages, and a division circuit 53 which receives the voltage signals from the current to voltage conversion circuits 51 and 52 and calculates the ratio between the photo-current from the central light receiving portion 41 and the photo-current from the peripheral light receiving portion 42.

An inner surface roughness measurement method for the fine tube 2 by the embodiment apparatus will be described below.

First, the beam diameter of laser light emitted from the laser light source 21 is expanded by the beam expander 22, and then, the laser light is introduced into the first end of the fine tube 2 at the incidence angle of 85° so that it is first converged upon the center line of the fine tube 2 in the axial direction by the cylindrical lens 23 and then diverged. In this instance, the fine tube 2 is held in a rotating condition by the holding mechanism 10. The laser light introduced into the fine tube 2 propagates to the second end of the fine tube 2 while it is reflected by multiple reflections on the inner surface of the fine tube 2, and then emerges from the second end of the fine tube 2. The emergent light from the fine tube 2 is condensed upon the photo detector 40 by the condensing lens 30. Specular reflection components of the emergent light are introduced to the central light receiving portion 41 of the photo detector 40 while diffuse scattering (reflection) components of the emergent light are introduced to the peripheral light receiving portion 42 of the photo detector 40, and they are individually converted into photo-currents by photo-electric conversion. The photo-currents are inputted to the signal processing circuit 50. In the signal processing circuit 50, the photo-currents are inputted to and converted by the current to voltage conversion circuits 51 and 52 into voltages. The voltage values are divided by the division circuit 53 to calculate the ratio between the photo-current of the central light receiving portion 41 of the photo detector 40 and the photo-current of the peripheral light receiving portion 42. The calculation of the ratio between the photo-current of the central light receiving portion 41 and the photo-current of the peripheral light receiving portion 42 by the signal processing circuit 50 corresponds to calculation of the ratio between the intensity of received light of the specular reflection components received by the central light receiving portion 41 and the intensity of received light of the diffuse scattering (reflection) components received by the peripheral light receiving portion 42. If the roughness of the inner surface of the fine tube 2 increases, the specular reflection components decrease and the diffuse scattering (reflection) components increase. Consequently, the roughness of the inner surface of the fine tube 2 can be measured with a high degree of accuracy in accordance with the ratio between the two components, that is, the ratio between the photo-current of the central light receiving portion 41 and the photo-current of the peripheral light receiving portion 42.

Figure 10:
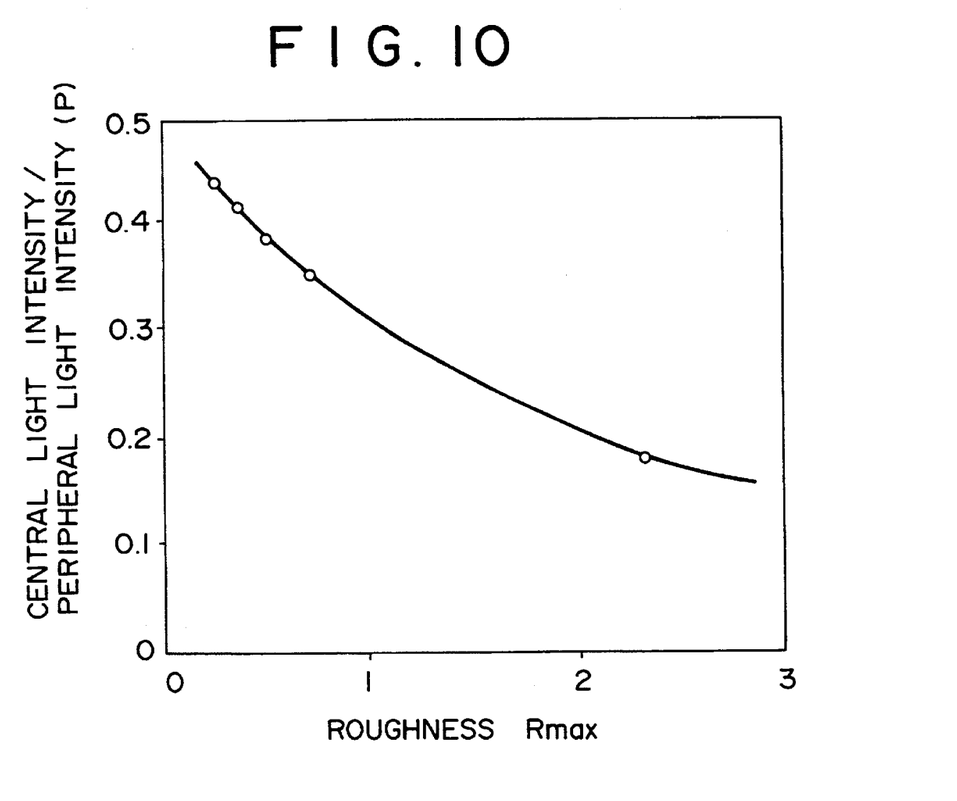
FIG. 10 is a graph showing the variation of the surface roughness with respect to the ratio between the intensity of central light and the intensity of peripheral light of emergent light from a fine tube.

Such a measurement method as described above was performed for a plurality of fine tubes 2 having inner surfaces which were different in roughness from one another, and the value P of the ratio between the intensity of received light of the central light receiving portion 41 and the intensity of received light of the peripheral light receiving portion 42 with respect to the roughness Rmax was plotted on a graph. As a result, such a characteristic as illustrated in FIG. 10 was obtained. From the characteristic, it can be seen that the value P increases in inverse proportion to the roughness Rmax, and the roughness Rmax can be measured with a high sensitivity from the value P.

Results of measurement of the intensity of received light of the central light receiving portion 41 and the intensity of received light of the peripheral light receiving portion 42 when the optical axis of the incident optics system 20 was varied with respect to a single fine tube 2 are shown in Table 2 below. From Table 2, it can be seen that, when the optical axis of the incident optics system 20 is varied, the intensity of received light of the central light receiving portion 41 or the peripheral light receiving portion 42 varies over a wide range. On the other hand, it can be seen that the variation of the value P of the ratio between the intensity of received light of the central light receiving portion 41 and the intensity of received light of the peripheral light receiving portion 42 is not very great comparing with the variations of the absolute values of the intensities of received light. Accordingly, even if the optical axis of the incident optics system 20 is offset with respect to the inner surface of the fine tube 2 because of one-sided location of the material of the fine tube 2 or from some other reason, the roughness of the inner surface of the fine tube 2 can be evaluated with a high degree of accuracy by using the value P of the ratio between the intensity of received light of the central light receiving portion 41 and the intensity of received light of the peripheral light receiving portion 42 as an evaluation value.

TABLE 2

| Offset Amount from Optical Axis | Central Light Intensity | Peripheral Light Intensity | Central Light Intensity/Peripheral Light Intensity |
|---|---|---|---|
| 0.136 | 0.075 | 0.187 | 0.426 |
| 0.110 | 0.110 | 0.265 | 0.433 |
| 0.080 | 0.150 | 0.359 | 0.431 |
| 0.056 | 0.191 | 0.445 | 0.440 |
| 0.034 | 0.222 | 0.522 | 0.434 |
| 0 | 0.225 | 0.525 | 0.438 |
| −0.025 | 0.216 | 0.513 | 0.430 |
| −0.051 | 0.174 | 0.422 | 0.423 |
| −0.082 | 0.130 | 0.318 | 0.423 |
| −0.114 | 0.082 | 0.210 | 0.412 |
| −0.142 | 0.056 | 0.146 | 0.415 |
| −0.165 | 0.042 | 0.112 | 0.415 |

It is to be noted that such various variations as described below are possible. For example, in place of the incident optics system 20 which employs such a cylindrical lens 23 as shown in FIGS. 1a–1b, a conical lens may be disposed with the center line thereof registered with the axial central line of the fine tube 2 such that laser light is shaped by beam shaping by the conical lens so that a laser beam having a conical face of the apex angle of, for example, 10° is introduced into the fine tube 2. Meanwhile, it is possible for the signal processing means to convert the photo-currents from the central light receiving portion 41 and the peripheral light receiving portion 42 by analog to digital conversion, input the digital signals thus obtained to a CPU or some other device so that the ratio between the intensity of received light of the central light receiving portion 41 and the intensity of received light of the peripheral light receiving portion 42 is calculated by software processing by the CPU or the like device to evaluate the roughness of the inner surface of the fine tube 2.

With the fine tube inner surface roughness measuring method and apparatus according to the first aspect of the present invention, there are natures that the intensity of light emerging from the second end of the fine tube increases in proportion to the product of the reflection factors at multiple reflection points on the inner surface of the fine tube and simultaneously the reflection factor on the inner surface of the fine tube decreases as the roughness of the inner surface of the fine tube increases. Thus, the intensity of the emergent light measured by the photo detector is varied in response to the surface roughness at the reflection points on the inner surface of the fine tube.

As a result, the roughness of the inner surface of the fine tube can be determined by the signal processing means in accordance with a result of detection by the photo detector of the intensity of the emergent light from the fine tube.

According to the second aspect of the present invention, the roughness of the inner surface of the fine tube can be measured non-destructively with a high degree of accuracy in accordance with the ratio between the intensity of light at a central portion and the intensity of light at a peripheral portion of the light emerging from the fine tube. Consequently, the roughness of the inner surface of the fine tube can be non-destructively tested with a high degree of accuracy without being influenced by the variation of the intensity of incident light to the fine tube or the offset of the optical axis of the incident light.

What is claimed is:

1. An apparatus for measuring the roughness of the inner surface of a tube, comprising: a holding mechanism for holding a tube having an inner surface whose roughness is to be measured;

polarization means for polarizing light from a light source in a polarizing direction;

an incident optics system positioned for converging light from the light source on the center line of the tube and then introducing the light into the tube at an incident angle with respect to the center line such that the light is reflected multiple times from an inner surface of the tube, wherein a direction of polarization of the polarized light is about 90° with respect to the inner surface of the tube from which the polarized light reflects;

a photo detector for receiving light emerging from a second end of the tube and outputting an electric signal corresponding the intensity of the light; and signal processing means for calculating the roughness of the inner surface of the tube in accordance with the electric signal output from said photo detector.

2. An apparatus for measuring the roughness of the inner surface of the tube according to claim 1, wherein said incident optics system includes an optical axis adjustment mechanism for adjusting the optical axis of the light from said light source so that the converging point of the light coincides with the center line of the tube.

3. An apparatus for measuring the roughness of the inner surface of the tube according to claim 1, further comprising a movable table for movably holding said entire incident optics system thereon, the optical axis of the light from said light source being adjusted by adjusting the position of said movable table.

4. An apparatus for measuring the roughness of the inner surface of the tube according to claim 1, wherein said holding mechanism includes a mechanism for rotating the tube around the axis of the same.

5. An apparatus for measuring the roughness of the inner surface of the tube according to claim 1 further comprising:

a receiving optics system from converging light emerging from the second end of the tube at a predetermined convergence position;

wherein said photo detector is disposed at the convergence position of the emergent light for measuring the intensity of light at a central portion of the convergent light and the intensity of light at a peripheral portion of the convergent light separately from each other; and wherein said signal processing means comprises means for calculating the roughness of the inner surface of the tube in accordance with the ratio between the intensity of light at the central portion of the convergent light and the intensity of light at the peripheral portion of the convergent light measured by said photo detector.

6. A method of measuring the roughness of an inner surface of a tube, comprising the steps of:

introducing light into the tube from a first end thereof, said introducing step comprising converging polarized light on the center line of the tube such that the light diverges from the center line, and applying the diverging light onto the inner surface of the tube at such an angle relative to the tube axis that the applied light is reflected multiple times from the inner surface of the tube and emerges from a second end of the tube; and evaluating the surface roughness of the inner surface of the tube based upon an intensity characteristic of the light emerging from the second end of the tube, wherein a direction of polarization of the polarized light is about 90° with respect to the inner surface of the tube from which the polarized light reflects.

7. A method of measuring the roughness of an inner surface of the tube according to claim 6 wherein said step of evaluating the surface roughness comprises:

measuring the intensity of light of specular reflection components and the intensity of light of diffuse scattering components of the light emerging from a second end of the tube; and measuring the roughness of the inner surface of the tube in accordance with the ratio between the intensity of light of the specular reflection components and the intensity of light of the diffuse scattering components.

8. A method of measuring the roughness of the inner surface of the tube according to claim 7, wherein the light emerging from the tube is converged, and the intensity of light at a central portion of the converged light and the intensity of light at a peripheral portion of the converted light are measured separately from each other to measure the intensity of light of the specular reflection components and the intensity of light of the diffuse scattering components.

* * * * *